United States Patent [19]

Talley et al.

[11] 4,126,474
[45] Nov. 21, 1978

[54] REFRACTORY FOR ALUMINUM-MELTING FURNACES

[75] Inventors: Raymond W. Talley, Newark, Del.; Ray A. Henrichsen, Glen Burnie; Wate T. Bakker, Severna Park, both of Md.

[73] Assignee: General Refractories Company, Bala Cynwyd, Pa.

[21] Appl. No.: 826,181

[22] Filed: Aug. 19, 1977

[51] Int. Cl.$^2$ .................... C04B 35/10; C04B 35/18; C04B 35/66
[52] U.S. Cl. .................... 106/63; 106/38.9; 106/65; 106/85; 164/41; 164/138
[58] Field of Search ............ 106/63, 64, 65, 38.9, 106/85; 164/41, 138

[56] References Cited

U.S. PATENT DOCUMENTS

| | | | |
|---|---|---|---|
| 1,507,379 | 9/1924 | Hoskins | 106/85 |
| 1,556,115 | 10/1925 | Hoskins | 106/85 |
| 3,078,173 | 2/1963 | Dolph | 106/63 X |
| 3,248,241 | 4/1966 | Rifai | 106/65 X |
| 3,427,174 | 2/1969 | Miller | 106/63 |
| 3,582,372 | 6/1971 | Criss et al. | 106/65 |
| 3,730,744 | 5/1973 | Yavorsky | 106/85 |
| 3,982,953 | 9/1976 | Ivarsson et al. | 106/65 |
| 4,030,936 | 6/1977 | Willis | 106/85 |
| 4,070,195 | 1/1978 | Toeniskoetter | 106/85 X |

FOREIGN PATENT DOCUMENTS

| | | | |
|---|---|---|---|
| 1,227,819 | 10/1966 | Fed. Rep. of Germany | 106/63 |
| 611,847 | 10/1960 | Italy | 106/73.4 |
| 49-20,365 | 5/1974 | Japan | 106/64 |

OTHER PUBLICATIONS

Fritsche, E. T. et al., "Liquidus in the Alumina-Rich System $La_2O_3-Al_2O_3$", J. Am. Cer. Soc., 50(3) 1967, pp. 167–168.

*Primary Examiner*—Helen McCarthy
*Attorney, Agent, or Firm*—Finnegan, Henderson, Farabow & Garrett

[57] ABSTRACT

An improved alumina or alumino-silicate refractory for lining aluminum-melting furnaces and other containers for molten aluminum including 0.5 to 30% by weight of $BaSO_4$. The addition of $BaSO_4$ to a phosphate-bonded or phosphate-free plastic, ramming mix, brick, mortar, or castables eliminates metal penetration and reduces dross and metal adherence.

11 Claims, No Drawings

REFRACTORY FOR ALUMINUM-MELTING FURNACES

BACKGROUND OF THE INVENTION

1. Field of the Invention

This invention relates to improved alumina or alumino-silicate refractories for lining aluminum-melting furnaces.

2. Description of the Prior Art

The linings of aluminum-melting furnaces are subject to erosion, corrosive attack, and undesirable adherence by the molten metal and dross held in such furnaces. Most non-phosphate bonded high alumina refractories have exhibited poor resistance to molten aluminum penetration. Phosphate-bonded high alumina refractories, in both burned and unburned forms, have been used with some success to line aluminum-melting furnaces. Although these linings have generally good resistance to metal penetration, after extended periods or when subjected to high temperatures they show metal penetration and excessive metal and dross adherence. The metal and dross adherence reduces furnace capacity and is difficult to remove by cleaning.

Attempts to improve the properties of high alumina refractories for lining aluminum-melting furnaces have been made. For example, in U.S. Pat. No. 3,078,173 to Dolph is disclosed a high alumina refractory brick containing a small percentage of an alkaline earth oxide. This improves resistance to aluminum penetration to some extent, but further improvement would be desirable. Moreover, since the alkaline earth oxides disclosed by Dolph react with phosphoric acid, the storage life of a phosphate-bonded high alumina refractory plastic or ramming mix is unsatisfactorily short.

It is an object of the present invention to provide a refractory for lining aluminum-melting furnaces and other containers for molten aluminum with improved resistance to metal penetration and to dross and metal adherence.

It is a further object of the present invention to provide a high alumina refractory that is phosphate-bonded and yet has a long storage life.

It is a further object of the present invention to provide such a refractory that is relatively inexpensive.

Other objects will be apparent from the following description of the invention.

SUMMARY OF THE INVENTION

The improved refractory of the present invention is achieved by the addition of 0.5 to 30% by weight of $BaSO_4$. This additive does not react with phosphoric acid and therefore is especially useful in phosphate-bonded refractories such as plastics or ramming mixes. Furthermore, it also improves the properties of phosphate-free refractories. Moreover, $BaSO_4$ is relatively stable and refractory—it is not known to decompose and has a melting point of 1580° C. $BaSO_4$ is readily available in native form under the name barytes and is relatively inexpensive. The improved refractories of the present invention completely eliminate metal penetration and greatly reduce dross and metal adherence, even at temperatures as high as 1700° F. Thus, refractories containing $BaSO_4$ greatly reduce furnace maintenance and increase service life.

DETAILED DESCRIPTION AND PREFERRED EMBODIMENTS

In accordance with the invention, an alumina refractory is one containing at least 45% by weight alumina. Alumina refractories conventionally also contain other constituents, such as silica, titania, and iron oxide and minor amounts of alkaline earth oxides.

The objects of the present invention are achieved with refractory compositions containing 0.5 to 30% $BaSO_4$. The refractory composition may include an alumina-silica refractory, such as pyrophyllite, calcined fireclay or kaolin, calcined bauxites, calcined aluminas, tabular and fused aluminas. The composition should contain at least 30% alumina, preferably at least 45% alumina.

The $BaSO_4$ is preferably present in the range of 3% to 10%. Impurities such as magnesite or alkali oxides may be present in minor amounts up to 5% by weight.

$BaSO_4$ is especially suited for phosphate-bonded refractories because it does not react with phosphoric acid. Other phosphate-containing materials, however, may be used as a binder, such as monoaluminum phosphates. However, instead of phosphate binders there may be used calcium aluminate, lignin liquors, and hydraulic binders. Calcium aluminate-bonded high alumina castables may be either dense or lightweight insulating type mixes.

The refractories of the present invention may be used as plastics, ramming mixes, brick (fired or unfired), mortars, or castables. The alumina is preferably provided in the form known as bauxite, and tabular alumina, although other sources of alumina, such as kaolin, may be used. Of course mixtures of these sources of alumina may also be used.

Even if fired, the refractory composition should not be vitrified or at least should contain no more than 10% by weight of a glass phase. Certain impurities, namely boron compounds, have a detrimental effect on the properties of the refractory and should not be present in an amount greater than 5%.

Other materials that may be included in the refractories according to the present invention are plasticizing agents, such as organic additives in amounts of about 0.5 to 5%, and other materials commonly present in refractories, such as plastic clays.

The refractories of the present invention may be produced by conventional processes. Thus, when producing a refractory plastic, the following range of particle sizes and steps may be used:

The raw materials may be crushed by normal methods to obtain a grind which is essentially all finer than 3 mesh (Tyler) and at least 25 percent finer than 150 mesh (Tyler). A typical example of such a grind is as follows:

|  | Percent By Weight |
| --- | --- |
| 3 +10 Mesh | 25 |
| 10 +28 Mesh | 18 |
| 28 +150 Mesh | 15 |
| 150 Mesh | 42 |

The size fractions are thoroughly mixed in standard equipment and sufficient liquid (about 8–15%) such as water, phosphoric acid, phosphates, or lignin liquor is added to form a plastic mass which is shaped into a block and then sliced into slabs for ease of handling. A monolithic furnace lining is then formed by ramming the plastic slabs in place.

The procedures used to produce a ramming mix are the same as for the plastic except that less liquid (about 3-10%) is added so that the mixed mass can be passed through a suitable shredding device to provide a granular product. This granular material can then be installed by ramming behind forms to obtain a monolithic furnace lining.

The following method is exemplary of the use of the refractory of the present invention for the production of brick:

The raw materials may be crushed by normal methods to obtain a grind which is essentially all finer than 3 mesh (Tyler) and at least 25 percent finer than 150 mesh (Tyler). A typical example of such a grind is as follows:

|  | Percent By Weight |
|---|---|
| 3 +10 Mesh | 7 |
| 10 +28 Mesh | 33 |
| 28 +150 Mesh | 20 |
| 150 Mesh | 42 |

The size fractions are thoroughly mixed in standard equipment and sufficient liquid such as water, phosphoric acid, phosphates, or lignin liquor is added to form a pressable mass, which is shaped into brick form and then dried and fired at a conventional temperature suitable for the particular composition. The brick are used in conjunction with a suitable mortar to construct a furnace lining.

The invention is further illustrated, but not limited by the following examples.

EXAMPLE I

| Compositions (%) and Properties of Phosphate-Bonded 85% $Al_2O_3$ Mixes | | | | |
|---|---|---|---|---|
|  | A | B | C | D |
| Calcined Bauxite (90% $Al_2O_3$) | 75 | 72 | 70 | 65 |
| Calcined Alumina | 22 | 22 | 22 | 22 |
| Bentonite | 3 | 3 | 3 | 3 |
| $BaSO_4$ (Barytes) | — | 3 | 5 | 10 |
| Test Results |  |  |  |  |
| Modules of Rupture After 2550° F, psi | 2450 | 2530 | 3300 | 2080 |
| Linear Change After 2550° F, % | +0.3 | −0.9 | −1.3 | −1.6 |
| Aluminum Cup Test, Max. Penetration, In. | ½ | 0 | 0 | 0 |

EXAMPLE II

| Composition (%) and Properties of Phosphate-Bonded 60% $Al_2O_3$ Mixes | | |
|---|---|---|
|  | E | F |
| Calcined Bauxite (60% $Al_2O_3$) | 75 | 65 |
| Calcined Alumina | 22 | 22 |
| Bentonite | 3 | 3 |
| $BaSO_4$ (Barytes) | — | 10 |
| Test Results: |  |  |
| Modulus of Rupture After 2550° F, psi | 2640 | 3440 |
| Linear Change After 2550° F, % | −0.5 | −1.1 |
| Aluminum Cup Test, Max. Penetration, In. | ½ | 0 |

EXAMPLE III

| Composition (%) and Properties of Phosphate-Free 45% $Al_2O_3$ Mixes | | |
|---|---|---|
|  | G | H |
| Calcined Kaolin | 75 | 65 |
| Ball Clay | 15 | 15 |
| Raw Kyanite | 10 | 10 |
| $BaSO_4$ (Barytes) | — | 10 |
| Test Results: |  |  |
| Modulus of Rupture After 2550° F, psi | 890 | 720 |
| Linear Change After 2550° F, % | +0.4 | +0.2 |
| Aluminum Cup Test, Max. Penetration, In. | ½ | 0 |

In each of the EXAMPLES I-III, the ingredients were crushed to the aforementioned grain sizing and thoroughly mixed dry. About 12% by weight of water and phosphoric acid were added to the compositions of EXAMPLES I and II; about 11% water and lignin liquor were added to the compositions in EXAMPLE III. The batches were then pressed into 9 × 4½ × 3 inch shapes at about 1,000 psi. The shapes were air-dried for about 24 hours, and then oven-dried at about 450° F. overnight.

The effect of molten aluminum was determined by the following procedure. Cavities were cut into the 9 × 4½ inch face of the dried samples by means of a series of saw kerfs. The cavities thus formed measured about 7 inches long, 2¼ inches wide, and 1¼ inches deep at the center. The samples were then heated to 1500° F. within five hours, at which time approximately one pound of aluminum alloy 7075 was introduced into each sample cavity. The aluminum was allowed to remain molten in the sample cavity at 1500° F. for 168 hours. After the 168-hour soak, the specimens were removed from the furnace, the molten metal was poured from the cavity, and the samples were allowed to cool. When the samples reached room temperature, they were cut into cross-sections to allow measurement of the aluminum penetration. The results of the penetration tests are shown in the EXAMPLE Tables.

Modulus of rupture and linear firing changes were measured on the pressed and dried samples after firing for five hours at 2550° F. These results are also shown. It can be observed from the test results that the molten aluminum penetration resistance of the base composition A, E, and G was greatly improved by the addition of $BaSO_4$, without causing deleterious change in other properties.

EXAMPLE IV

| Composition (%) and Properties of Burned Phosphate-Bonded 85% $Al_2O_3$ Mixes | | | |
|---|---|---|---|
|  | I | J | K |
| Calcined Bauxite (90% $Al_2O_3$) | 83 | 80 | 78 |
| Calcined Alumina | 10 | 10 | 10 |
| Clay | 7 | 7 | 7 |
| $BaSO_4$ (Barytes) | 0 | 3 | 5 |
| Test Results: |  |  |  |
| Aluminum Cup Test, Max. Penetration, In. | 3/16 | 0 | 0 |

For each of the compositions of EXAMPLE IV, the ingredients were crushed to the aforementioned grain sizing and thoroughly mixed dry. About 4% by weight of water and phosphoric acid were added to the compositions to form a pressable mass. The batches were then pressed into 9 × 4½ × 3 inch shapes at about 8000 psi. The shapes were air-dried for about 24 hours, and then oven-dried at about 450° F. overnight.

The effect of molten aluminum was determined by the same procedure described for EXAMPLES I-III.

It can be observed from the test results that the molten aluminum penetration resistance of the base composition I was greatly improved by the addition of $BaSO_4$.

As demonstrated by the examples, the refractories of the present invention, when used to line aluminum-melting furnaces, are superior to prior refractories in resistance to metal penetration and dross and metal adherence without detriment to other properties required in refractories. Moreover, stability of refractory plastics and ram mixes according to the present invention is superior compared to the short storage life of phosphate-bonded plastics and ram mixes that use alkaline earth compounds other than $BaSO_4$.

As an example, when BaO was used in place of $BaSO_4$ in compositions containing phosphoric acid, storage life of the plastic mass was reduced from over three months to less than one hour. This would not, however, preclude the use of BaO or other barium compounds in compositions containing binder components other than wet phosphates.

It will be apparent to those skilled in the art that various modifications and variations could be made in the refractories of the invention without departing from the scope or spirit of the invention.

What is claimed is:

1. In an unfired phosphate-bonded alumina or alumino-silicate refractory for lining aluminum-melting furnaces and other containers for molten aluminum, the binder in said refractory consisting essentially of a wet phosphate binder, the improvement comprising the addition of 0.5 to 30% by weight of $BaSO_4$, said refractory having improved resistance to metal penetration and to dross and metal adherence and improved storage life.

2. The refractory of claim 1, wherein said phosphate is provided as phosphoric acid.

3. The refractory of claim 3, wherein said refractory is a plastic.

4. The refractory of claim 3, wherein said refractory is a ramming mix.

5. The refractory of claim 3, wherein said refractory is in the form of a brick.

6. The refractory of claim 3, wherein said refractory is in the form of a mortar.

7. The refractory of claim 4, wherein alumina is present in the amount of at least 30% by weight.

8. The refractory of claim 4, wherein alumina is present in the amount of at least 45% by weight.

9. The refractory of claim 4, wherein $BaSO_4$ is present in the range of 3% to 10% by weight.

10. In an unfired phosphate-bonded refractory for lining aluminum-melting furnaces, said refractory consisting essentially of alumina, water, and phosphoric acid, the improvement comprising the addition of 0.5% to 30% by weight of $BaSO_4$, said refractory having improved resistance to molten metal penetration and to dross and metal adherence and improved storage life.

11. The refractory of claim 10, wherein $BaSO_4$ is present in the range of 3% to 10% by weight.

* * * * *

UNITED STATES PATENT AND TRADEMARK OFFICE
CERTIFICATE OF CORRECTION

PATENT NO. : 4,126,474
DATED : November 21, 1978
INVENTOR(S) : Raymond W. Talley et al It is certified that error appears in the above-identified patent and that said Letters Patent are hereby corrected as shown below:

```
Claim 3, line 1, change "3" to --2--;
Claim 4, line 1, change "3" to --2--;
Claim 5, line 1, change "3" to --2--;
Claim 6, line 1, change "3" to --2--'
Claim 7, line 1, change "4" to --2--;
Claim 8, line 1, change "4" to --2--'
Claim 9, line 1, change "4" to --2--.
```

Signed and Sealed this

Thirteenth Day of March 1979

[SEAL]

Attest:

RUTH C. MASON
Attesting Officer

DONALD W. BANNER
Commissioner of Patents and Trademarks